United States Patent [19]

DuLaney et al.

[11] Patent Number: 4,782,109

[45] Date of Patent: Nov. 1, 1988

[54] LATEX PAINT FORMULATIONS AND METHODS

[75] Inventors: Donald C. DuLaney; Robert H. Lindsay, both of Madison, Wis.

[73] Assignee: Lindsay Finishes, Incorporated, Madison, Wis.

[21] Appl. No.: 78,835

[22] Filed: Jul. 28, 1987

Related U.S. Application Data

[63] Continuation of Ser. No. 878,814, Jun. 26, 1986, abandoned.

[51] Int. Cl.$^4$ .............................. C08J 3/02; C08K 3/20
[52] U.S. Cl. ..................................... 524/501; 524/523; 524/524
[58] Field of Search ......................... 524/501, 523, 524

[56] References Cited

U.S. PATENT DOCUMENTS

| | | | |
|---|---|---|---|
| 2,918,391 | 12/1959 | Hornibrook | 117/75 |
| 3,205,188 | 9/1965 | Cole | 260/29.7 |
| 3,232,899 | 2/1966 | Guziak | 260/29.6 |
| 3,297,614 | 1/1967 | Pueschner et al. | 260/29.6 |
| 3,326,836 | 6/1967 | Snyder et al. | 260/29.6 |
| 3,487,031 | 12/1969 | Muroi et al. | 260/8 |
| 3,585,172 | 6/1971 | Nishiyama et al. | 260/78.5 |
| 3,794,607 | 2/1974 | Torimitsu et al. | 260/29.6 |
| 4,001,159 | 1/1977 | Imai et al. | 260/29.6 |
| 4,036,652 | 7/1977 | Rothmayer | 524/560 |
| 4,225,475 | 9/1986 | Carumpalos | 524/271 |
| 4,285,997 | 8/1981 | Vasishth et al. | 524/523 |
| 4,309,179 | 1/1982 | Heuser et al. | 524/512 |
| 4,313,861 | 2/1982 | Bassett et al. | 260/29.6 |
| 4,366,293 | 12/1982 | Tobias | 525/301 |
| 4,500,673 | 2/1985 | Devona et al. | 524/548 |
| 4,503,184 | 3/1985 | Marongin | 524/523 |
| 4,522,972 | 6/1985 | Mondt et al. | 524/548 |

FOREIGN PATENT DOCUMENTS 60-67571  4/1985  Japan .................. 524/524

OTHER PUBLICATIONS

Advances in Chemistry Series 125–AC–S Washington DC. (1973) Nakajima–pp. 98–107.

*Primary Examiner*—Joseph L. Schofer
*Assistant Examiner*—N. Sarofim
*Attorney, Agent, or Firm*—Wood, Dalton, Phillips Mason & Rowe

[57] ABSTRACT

A paint comprising a solution of an internal phase comprising pigment and latex resin and an external phase comprising an amine soluble resin dissolved in water is disclosed. The amine soluble resin has a molecular weight sufficiently high that it imparts desirable film properties while maintaining surface applicability of the paint. Upon evaporation of the water, the external phase forms a substantially continuous film encapsulating the internal phase. The invention also comprehends a novel method of paint formulation.

29 Claims, No Drawings

LATEX PAINT FORMULATIONS AND METHODS

This is a continuation of application Ser. No. 878,814, abandoned, filed June 26, 1986.

BACKGROUND OF THE INVENTION

1. Field of the Invention

The present invention relates generally to paint formulations and, more particularly, this invention relates to paint solutions and methods of preparing the same.

2. Description of Related Art

In the past, solvent based paints have generally outperformed latex paints whenever there has been a comparison of properties such as water resistance, abrasion resistance, resistance to moisture vapor transmission, adhesion to most surfaces, gloss quality, recoatability, and minimum application temperatures. Differences in the formulations of solvent based paints and latex paints, at least in part, account for the differences in the properties of the resulting paint films formed thereby.

In solvent based paints, there is an external phase consisting of a resin (or an oil) dissolved in a solvent and an internal phase consisting of a pigment dispersed to a finite particle size. Upon evaporation of the solvent, a film is left behind wherein the internal phase is completely encapsulated by the external phase which itself has flowed out to form a continuous, impermeable entity. A solvent based paint formulation may be such that the film resulting upon evaporation of the solvent crosslinks (cures), at either ambient or elevated temperatures, with other materials in the external phase or with oxygen in the air to form larger molecules. In several systems, most notably vinyls and lacquers, the external phase does not "cure" but rather forms a film after the solvent, which had been used to solubilize the resin, has evaporated.

Solvent based paints, however, have several disadvantages. First, volatile organic solvents are costly and sometimes noxious and dangerous to use. Second, the viscosities of solvent based compositions vary significantly with the amount and molecular weight of the dissolved film former. Also, the application characteristics of these solution coatings often make it necessary to apply many coatings of these materials since they contain a low percentage of solids.

Generally, conventional latex paints include two phases, an external phase and an internal phase. The external phase is water in which additives, such as wetting agents (surfactants or emulsifiers), dispersants, cellulosic thickeners to control paint rheology and package stability, glycols to control application characteristics and temperature sensitivity, and bactericides to protect the paint from bacterial attack and putrefaction, are added. Film forming solvents, also known as coalescing agents, may also be added to the formulations. If the coalescing agents are miscible with water, they may be dissolved in the external phase, otherwise, they may be emulsified so as to become a part of the internal phase.

The internal phase of conventional latex paints contains pigment dispersed to finite particle size, latex particles which can never be solubilized and, in some cases, micelles of film forming solvent. Upon evaporation of the water, a relatively non-continuous film of particles of pigment and latex is left behind. The particles comprising this latex paint film are bound together and adhere to the surface to which the paint has been applied by means of the latex particles which are softened and made adherent by the addition of the film-forming solvent. The resulting softened latex particles are adherent to each other, to pigment particles and to the surface to which the latex paint is applied.

As is generally known in the art, unless heated to a sufficient temperature so as to melt the latex particles, conventional latex paint formulations which include film forming solvents result in latex paint films which are not as densely packed or as free from air pockets as those films resulting from solvent-based paints.

Alternatively, a latex paint may be prepared without including film forming solvents therein by preparing a relatively soft latex resin. Such a soft latex resin is very adherent, but this adhesiveness in turn creates problems. For example, soft latex resins generally have poor package stability and oftentimes result in permanently sticky films.

Also, the presence of dispersants and/or wetting agents in a paint formulation leave the film formed by that paint permanently sensitive to water and cleaning agents.

Thus, while known latex paint formulations generally avoid many of the aforementioned disadvantages of solvent based paints, they generally do not form tough, smooth, water-resistant coatings which adhere well to finished substrate surfaces.

SUMMARY OF THE INVENTION

It is an object of the present invention to overcome one or more of the problems described above.

According to the present invention, a paint comprises a solution with an internal phase comprising pigment and latex resin and an external phase comprising an amine soluble resin dissolved in water. The amine soluble resin has a molecular weight sufficiently high that it imparts desirable film properties to the paint, while maintaining surface applicability of the paint. Upon evaporation of the water, the external phase is effective in forming a substantially continuous film encapsulating the internal phase.

In addition to the paint formulation, the invention comprehends a novel method of formulating paints.

Other objects and advantages of the invention will be apparent to those skilled in the art from the following detailed description, taken in conjunction with the appended claims.

DETAILED DESCRIPTION OF THE INVENTION

According to the invention, a paint with an internal phase comprising pigment and latex resin and an external phase comprising an amine soluble resin dissolved in water is provided. The amine soluble resin has a molecular weight sufficiently high that it imparts desirable film properties to the paint, while maintaining the surface applicability of the paint. Upon evaporation of the water, the external phase is effective in forming a substantially continuous film encapsulating the internal phase.

In this formulating approach to hybrid latex paints, an amine soluble polymer, typified by the proprietary resin manufactured by S. C. Johnson & Son, Inc., U.S. Specialty Chemicals Division, Racine, Wis., and supplied in a solid flake form under the trademark Joncryl 678 or, alternatively, in a water solution form under the trademark Joncryl 61LV is used and eliminates the necessity of using dispersants and wetting agents because the solubilized resin acts to totally encapsulate the pigment and emulsion resins that are present.

Joncryl 678 is an acid functional, styrene acrylic resin having an acid value of 200. Joncryl 61LV constitutes a styrene acrylic resin solution including:

|  | Joncryl 61 LV Formula (% by wt.) |
| --- | --- |
| Joncryl 678 Styrene Acrylic Resin | 35.0 |
| Ammonia (28%) | 7.5 |
| Ethylene Glycol | 1.5 |
| Isopropyl Alcohol | 5.0 |
| Water | 51.0 |
| TOTAL | 100.0 |

In the Joncryl 61LV styrene acrylic resin solution, it is believed that the ammonia serves primarily as a solubilizing agent and that the isopropyl alcohol and ethylene glycol are present as rheology control agents permitting the development of solutions containing a relatively great proportion of solids.

To date, the use of Joncryl 678 styrene acrylic resin with a molecular weight range of about 5,000–9,000 has been preferred with resin having a molecular weight of about 7,000 being highly preferred. Too high a molecular weight results in the need to incorporate co-solvents into the formulation so as to produce acceptable paint films. The use of such co-solvents, however, results in many of the aforementioned disadvantages of solvent based paints. An insufficient molecular weight for the amine soluble resin results in a paint film lacking some of the desired film properties including, for example, hardness, toughness, adhesion, UV resistance, and solvent resistance.

Research has shown that the proper use of an effective amount of the amine soluble resin results in a paint formulation exhibiting improved water resistance of the latex resin used therein, whether the latex resin be polyvinyl acetate copolymers, acrylic copolymers, styrene-acrylic copolymers, styrene-butadiene copolymers, etc. In particular, the amine soluble resin upgrades the performance of polyvinyl acetate copolymers substantially, giving them water resistance and wet adhesion properties generally superior to many of the finest acrylic polymer latex resins.

Generally, the amine soluble resin has been used in amounts resulting in the resin comprising about 10%–50% of the total solids present in the formulation. To date, those latex paint formulations wherein the amine soluble resin comprises 20%–30% of the total resin solids present generally exhibit superior performance characteristics. In those paint formulations wherein over 30% of the total resin solids are present as the amine soluble resin, the use of a compatible plasticizer is generally required to avoid embrittlement of the film resulting upon evaporation of the water contained therein.

In the invention, the external phase of the paint includes the amine soluble resin, e.g., Joncryl 61LV, dissolved in water, with suitable cellulosic thickeners and bactericides added thereto, as desired. The internal phase of the inventive paint formulations include pigment and latex particles. After application of the inventive paint formulation to a surface and upon evaporation of the water contained therein, a film results, wherein the internal phase of pigment and latex particles is completely encapsulated by the external phase which itself has flown out to form a continuous, impermeable entity.

The films resulting from the inventive paint formulations may have many desirable film characteristics, including good hardness, flexibility, adhesion, recoatability, detergent resistance, and blocking resistance, excellent gloss in enamels, water resistance, vapor transmission barrier, corrosion resistance in metal primers and wear resistance in floor enamels and traffic paints as well as a high volume of solids which results in thicker paint films. In addition, the paints themselves generally exhibit other desirable properties such as simplicity and economy in manufacture, low odor and low volatile organic compound content as well as excellent application properties for brush, roller, and/or spray.

Two sets of tests were run comparing the impermeability characteristics of the films formed with the inventive formulations with those films formed by conventional latex paints. In the first set of tests, films of both the inventive formulation and conventional latex paint formulations were cast on glass and immersed in water. In every case, the conventional latex paint broke and/or blistered off of the glass within two hours while the film resulting from the inventive formulation was still on the glass 30 days later, at which time the test was discontinued.

In the second set of tests, the moisture vapor transmission rate of the films formed by conventional latex paints and the inventive paint formulations were compared. It was found that conventional latex paints generally have a very high rate of water vapor transmission (not under pressure) whereas the inventive formulations results in a film having a very low rate of water vapor transmission, lower than vinylidene chloride and many solvent based paints.

The latex paint formulations of the invention have excellent adhesion and wet-adhesion to a wide variety of substrates. Examples of substrates with which the inventive formulations may be used include; glass, ceramics, concrete, asphalt, aluminum, brass, copper, steel, paper, plaster, dry wall, wood, many plastics, and most other types of paints.

Paint products formulated with this technology include block fillers, spray flat paints, flat paints, traffic marking paints, semi-gloss enamels, gloss enamels, anti-corrosive steel primers, aluminum primers, wood primers, gloss and satin clear finishes for wood and other surfaces, wood stains and sealers, vapor barrier coatings, wall primers and sealers, and floor enamels.

It has been discovered that the addition of a small amount of calcium hydroxide, lime, zinc oxide, or zinc ammonium complex solution to the formulations of the invention further insolubilizes the Joncryl 61LV and latex resins and thus increases the resistance of the inventive formulations to caustic and alkaline cleaners, e.g., cleaning agents containing a salt of a strong base and a weak acid such as trisodium phosphate, for example.

The following examples illustrate the practice of the present invention. It is to be understood that all changes and modifications that come within the spirit of the invention are desired to be protected and thus the invention is not to be construed as limited by these examples.

EXAMPLES 1-13

In the following examples, the amine soluble resin and, where desired, pigment and/or various paint additives such as defoamer, biocide, calcium carbonate and glycol, for example, were dispersed. Dispersers such as those manufactured by Myers Engineering of Bell, Calif. as are known in the art may be used to effect the paint dispersion.

The time required so as to attain the desired degree of dispersion is generally proportional to the size of pigment particles used therein. In practice, the time of dispersion generally runs between about 15 and 20 minutes.

The Hegman scale is commonly used in the art as a measure of the degree of dispersion, with values ranging from 0–7. [For example, see ASTM Designation: D 1210-79 (Reapproved 1983)—"Standard Test Method for Fineness of Dispersion of Pigment-Vehicle Systems"]. Table I (below) shows the Hegman scale values generally sought for various types of paint preparations.

TABLE 1

| Preparation | Hegman Units |
|---|---|
| Enamels (both gloss and semi-gloss) | at least 6 |
| Primers | 3–4 |
| Flats | 3 |

Upon attaining the desired dispersion, the agitation speed in the disperser was slowed and latex resin was added to the dispersed mixture so as to arrive at the final product.

EXAMPLE 1—GLOSS ENAMEL

| MATERIALS | POUNDS |
|---|---|
| A. Using high speed dispersion, dispersed the following: | |
| Water | 125.0 |
| Methyl Cellulose | 3.0 |
| Defoamer | 1.5 |
| Biocide | 1.2 |
| Amine Soluble Styrene-Acrylic Resin Solution | 174.0 |
| Titanium Dioxide | 250.0 |
| B. Added the following to the above dispersion: | |
| Amine Soluble Styrene-Acrylic Resin Solution | 87.0 |
| Vinyl Acetate-Butyl Acrylate Latex | 450.0 |
| | 1091.7 |
| C. Mixed | |

EXAMPLE 2—GLOSS ENAMEL

| MATERIALS | POUNDS |
|---|---|
| A. Using high speed dispersion, dispersed the following: | |
| Water | 25.0 |
| Defoamer | 1.5 |
| Amine Soluble Styrene-Acrylic Resin Solution | 174.0 |
| Titanium Dioxide | 250.0 |
| B. Added the following to the above dispersion: | |
| Amine Soluble Styrene-Acrylic Resin Solution | 87.0 |
| Acrylic Latex | 490.0 |
| Polyethylene Emulsion | 49.2 |
| | 1076.7 |
| C. Mixed | |

EXAMPLE 3—SEMI-GLOSS ENAMEL

| MATERIALS | POUNDS |
|---|---|
| A. Using high speed dispersion, dispersed the following: | |
| Amine Soluble Styrene-Acrylic Resin Solution | 174.0 |
| Ethylene Glycol | 27.8 |
| Methyl Cellulose | 4.0 |
| Titanium Dioxide | 215.0 |
| Calcium Carbonate | 100.0 |
| Defoamer | 1.5 |
| B. Added the following to the above dispersion: | |
| Vinyl Acetate-Butyl Acrylate Latex | 378.0 |
| Biocide | 1.2 |
| Water | 225.0 |
| | 1126.5 |
| C. Mixed | |

EXAMPLE 4—RED FLOOR ENAMEL

| MATERIALS | POUNDS |
|---|---|
| A. Using high speed dispersion, dispersed the following: | |
| Amine Soluble Styrene-Acrylic Resin Solution | 95.7 |
| Propylene Glycol | 25.9 |
| Defoamer | 1.5 |
| Black Iron Oxide | 10.0 |
| Red Iron Oxide | 100.0 |
| Calcium Carbonate | 85.0 |
| B. Added the following to the above dispersion: | |
| Amine Soluble Styrene-Acrylic Resin Solution | 174.0 |
| Vinyl Acetate-Butyl Acrylate Latex | 486.0 |
| Water | 50.0 |
| | 1028.1 |
| C. Mixed | |

EXAMPLE 5—HIGH SOLIDS FLAT

| MATERIALS | POUNDS |
|---|---|
| A. Using high speed dispersion, dispersed the following: | |
| Water | 200.0 |
| Methyl Cellulose | 5.0 |
| Amine Soluble Styrene-Acrylic Resin Solution | 91.4 |
| Defoamer | 1.5 |
| Biocide | 1.2 |
| Titanium Dioxide | 150.0 |
| Calcium Carbonate | 550.0 |
| Magnesium Silicate | 100.0 |
| Hydrous Clay | 2.0 |
| Silica | 50.0 |
| B. Added the following to the above dispersion: | |
| Vinyl Acetate-Butyl Acrylate Latex | 148.5 |
| Water | 150.0 |
| | 1451.6 |
| C. Mixed | |

EXAMPLE 6—LOW COST FLAT

| MATERIALS | POUNDS |
|---|---|
| A. Using high speed dispersion, dispersed the following: | |
| Water | 350.0 |
| Methyl Cellulose | 7.0 |

-continued

| MATERIALS | POUNDS |
|---|---|
| Amine Soluble Styrene Acrylic Resin Solution | 56.2 |
| Defoamer | 1.5 |
| Biocide | 1.2 |
| Titanium Dioxide | 100.0 |
| Calcium Carbonate | 300.0 |
| Magnesium Silicate | 50.0 |
| B. Added the following to the above dispersion: | |
| Vinyl Acetate-Butyl Acrylate Latex | 81.0 |
| Water | 200.0 |
| | 1146.9 |
| C. Mixed | |

EXAMPLE 7—CEMENT BLOCK FILLER

| MATERIALS | POUNDS |
|---|---|
| A. Using high speed dispersion, dispersed the following: | |
| Water | 300.0 |
| Hydroxyethyl Cellulose | 5.0 |
| Defoamer | 1.5 |
| Biocide | 2.4 |
| Amine Soluble Styrene-Acrylic Resin Solution | 130.5 |
| Titanium Dioxide | 10.0 |
| Mica | 50.0 |
| Calcium Carbonate | 500.0 |
| Magnesium Silicate | 250.0 |
| B. Added the following to the above dispersion: | |
| Vinyl Acetate-Butyl Acrylate Latex | 229.5 |
| | 1478.9 |
| C. Mixed | |

EXAMPLE 8—WHITE TRAFFIC PAINT

| MATERIALS | POUNDS |
|---|---|
| A. Using high speed dispersion, dispersed the following: | |
| Water | 200.0 |
| Methyl Cellulose | 2.0 |
| Amine Soluble Styrene-Acrylic Resin Solution | 95.7 |
| Defoamer | 1.5 |
| Titanium Dioxide | 100.0 |
| Silica | 100.0 |
| Calcium Carbonate | 375.0 |
| Magnesium Silicate | 100.0 |
| B. Added the following to the above dispersion: | |
| Vinyl Acetate-Butyl Acrylate Latex | 225.0 |
| Water | 100.0 |
| | 1299.2 |
| C. Mixed | |

EXAMPLE 9—FERROUS METAL PRIMER

| MATERIALS | POUNDS |
|---|---|
| A. Using high speed dispersion, dispersed the following: | |
| Amine Soluble Styrene-Acrylic Resin Solution | 191.4 |
| Ethylene Glycol | 18.5 |
| Red Iron Oxide | 75.0 |
| Lampblack | 2.0 |
| Modified Barium Metaborate | 100.0 |
| Silica | 230.0 |
| Magnesium Silicate | 225.0 |
| Water | 50.0 |
| Defoamer | 1.5 |

| MATERIALS | POUNDS |
|---|---|
| B. Added the following to the above dispersion: | |
| Styrene-Acrylic Latex | 422.4 |
| | 1315.8 |
| C. Mixed | |

EXAMPLE 10—FERROUS METAL PRIMER

| MATERIALS | POUNDS |
|---|---|
| A. Using high speed dispersion, dispersed the following: | |
| Water | 100.0 |
| Methyl Cellulose | 1.0 |
| Defoamer | 1.5 |
| Amine Soluble Styrene-Acrylic Resin Solution | 174.0 |
| Modified Barium Metaborate | 100.0 |
| Red Iron Oxide | 75.0 |
| Lampblack | 1.0 |
| Silica | 140.0 |
| Magnesium Silicate | 200.0 |
| B. Added the following to the above dispersion: | |
| Vinyl Acetate-Butyl Acrylate Latex | 306.0 |
| Water | 175.0 |
| | 1273.5 |
| C. Mixed | |

EXAMPLE 11—LOW VAPOR TRANSMISSION RATE PRIMER

| MATERIALS | POUNDS |
|---|---|
| A. Using high speed dispersion, dispersed the following: | |
| Water | 150.0 |
| Amine Soluble Styrene Acrylic Resin Solution | 174.0 |
| Methyl Cellulose | 4.0 |
| Titanium Dioxide | 100.0 |
| Mica | 25.0 |
| Calcium Carbonate | 200.0 |
| Silica | 75.0 |
| B. Added the following to the above dispersion: | |
| Vinyl Acetate-Butyl Acrylate Latex | 306.0 |
| Biocide | 1.2 |
| Water | 100.0 |
| | 1136.7 |
| C. Mixed | |

EXAMPLE 12—TEXTURE FINISH

| MATERIALS | POUNDS |
|---|---|
| A. Using high speed dispersion, dispersed the following: | |
| Water | 400.0 |
| Amine Soluble Styrene Acrylic Resin Solution | 39.2 |
| Defoamer | 1.5 |
| Methyl Cellulose | 6.5 |
| Biocide | 1.2 |
| Titanium Dioxide | 50.0 |
| Precipitated Calcium Carbonate | 150.0 |
| Silica | 225.0 |
| Pumice | 65.0 |
| B. Added the following to the above dispersion: | |
| Vinyl Acetate-Butyl Acrylate Latex | 99.0 |
| Water | 162.5 |
| | 1199.9 |

-continued

| MATERIALS | POUNDS |
|---|---|
| C. Mixed | |

EXAMPLE 13—CLEAR FINISH

| MATERIALS | POUNDS |
|---|---|
| A. Using high speed dispersion, dispersed the following: | |
| Amine Soluble Styrene-Acrylic Resin Solution | 365.4 |
| Polymeric Plasticizer | 42.0 |
| Acrylic Latex | 341.3 |
| Propylene Glycol | 25.9 |
| Defoamer | 1.5 |
| Polyethylene Emulsion | 41.0 |
| Water | 50.0 |
| | 867.1 |

EXAMPLES 14 AND 15

The following examples show the moisture vapor permeability of formulations of the invention as compared to comparison formulations. In example 14 the low vapor transmission rate primer of example 11 was tested and in example 15 the low vapor transmission primer of example 11 with the addition of diethylene glycol monoethyl ether acetate coalescing solvent was tested. In each case, the samples tested were drawn over 25 lbs./ream Eddy Kraft paper using a #40 wire rod. A dried film thickness of 3 mils was accomplished by 2 coats, 4 hours apart. After curing for 10 days these films were attached to a 0.0025 m$^2$ permeability cup and tested for water vapor permeability using the ASTM-D-1653-72 method for testing moisture vapor permeability of organic coating films. The conditions and results are listed below:

TABLE II

| | Sample | |
|---|---|---|
| | 14 | 15 |
| Identification Exp. | 67-134 | 67-269 |
| Thickness of Film | 3 mils | 3 mils |
| Test Temperature | 100° F. | 100° F. |
| Relative Humidity | 90% | 90% |
| Test Period | 232 hrs. | 232 hrs. |
| Permeance (perms) | 0.011 | 0.024 |

As a comparison, the permeance of the control sample and a sample of vinylidene chloride are 0.06 perms and 0.021 perms, respectively.

The foregoing detailed description is given for clearness of understanding only, and no unnecessary limitations are to be understood therefrom, as modifications within the scope of the invention will be obvious to those skilled in the art.

We claim:

1. A paint solution substantially free of crosslinking consisting of:
   an internal phase comprising pigment and latex resin; and
   an external phase comprising an amine-soluble resin dissolved in water, said amine-soluble resin having a molecular weight sufficiently high that said amine soluble resin imparts an improvement in desirable film properties including hardness, flexibility, adhesion, water resistance and a high volume of solids to said paint while maintaining surface applicability of said paint, said external phase being effective in forming a substantially continuous film encapsulating said internal phase upon evaporation of said water at ambient temperature.

2. The paint of claim 1 wherein said amine soluble resin is a styrene acrylic resin.

3. The paint of claim 2 wherein said styrene acrylic resin has a molecular weight in the range of about 5,000–9,000.

4. The paint of claim 3 wherein said styrene acrylic resin has a molecular weight of about 7,000.

5. The paint of claim 1 wherein said latex resin comprises a resin selected from the group consisting of polyvinyl acetate copolymers, acrylic copolymers, styrene-acrylic copolymers and styrene-butadiene copolymers.

6. The paint of claim 1 wherein said amine soluble resin comprises about 10–50% of the total resin solids present in said solution.

7. The paint of claim 6 wherein said amine soluble resin comprises about 20–30% of the total solids in said solution.

8. The paint of claim 1 wherein said amine soluble resin comprises more than about 30% of the total solids present in said solution and said paint additionally includes a compatible plasticizer effective in minimizing embrittlement of the film formed upon evaporation of said water.

9. The paint of claim 1 wherein dissolution of said amine soluble resin in said water is enhanced by the presence of a solubilizing agent.

10. The paint of claim 9 wherein said solubilizing agent comprises ammonia.

11. The paint of claim 1 additionally including an additive effective in reducing sensitivity to cleaning agents.

12. The paint of claim 11 wherein said cleaning agents comprise a salt of a strong base and a weak acid.

13. The paint of claim 10 wherein said additive is selected from the group consisting of lime and calcium hydroxide.

14. A method of formulating a paint capable of being set without the use of a crosslinking agent or the addition of heat comprising the steps of:
   dispersing an amine-soluble resin and pigment at high speed to form a mixture, said amine soluble resin having a molecular weight sufficiently high that said amine soluble resin imparts in improvement in desirable film properties including hardness, flexibility, adhesion, water resistance and a high volume of solids to said paint while maintaining surface applicability of said paint; and
   mixing a latex resin with said mixture.

15. The method of claim 14 wherein said paint is an enamel and said high speed dispersing step is continued until said enamel attains a Hegman level of at least about 6.

16. The method of claim 14 wherein said paint is a primer and said high speed dispersion is continued until said primer attains a Hegman level of about 3–4.

17. The method of claim 14 wherein said paint is a flat paint and said high speed dispersion is continued until said flat paint attains a Hegman level of about 3.

18. The method of claim 14 wherein said amine soluble resin is a styrene acrylic resin.

19. The method of claim 18 wherein said styrene acrylic resin has a molecular weight in the range of about 5,000–9,000.

20. The method of claim 19 wherein said styrene acrylic resin has a molecular weight of about 7,000.

21. The method of claim 14 wherein said latex resin comprises a resin selected from the group consisting of polyvinyl acetate copolymers, acrylic copolymers, styrene-acrylic copolymers and styrene-butadiene copolymers.

22. The method of claim 14 wherein said amine soluble resin comprises about 10-50% of the total resin solids present in said solution.

23. The method of claim 22 wherein said amine soluble resin comprises about 20-30% of the total solids in said solution.

24. The method of claim 14 wherein said amine soluble resin comprises more than about 30% of the total solids present in said solution and said paint additionally comprises a compatible plasticizer effective in minimizing embrittlement of the film formed upon evaporation of said water.

25. The method of claim 14 wherein dissolution of said amine soluble resin in said water is enhanced by the presence of a solubilizing agent.

26. The method of claim 25 wherein said solubilizing agent comprises ammonia.

27. The method of claim 14 wherein said paint additionally includes an additive effective in reducing sensitivity to cleaning agents.

28. The method of claim 27 wherein said cleaning agents comprise a salt of a strong base and a weak acid.

29. The method of claim 28 wherein said additive is selected from the group consisting of lime and calcium hydroxide.

* * * * *